United States Patent [19]
Wada

[11] Patent Number: 5,872,886
[45] Date of Patent: Feb. 16, 1999

[54] ELECTRONIC APPARATUS HAVING IMAGE-SHAKE CORRECTING DEVICE

[75] Inventor: Hidetoshi Wada, Kanagawa-ken, Japan

[73] Assignee: Canon Kabushiki Kaisha, Tokyo, Japan

[21] Appl. No.: 945,000

[22] Filed: Oct. 7, 1997

Related U.S. Application Data

[62] Division of Ser. No. 685,213, Jul. 23, 1996, Pat. No. 5,727,115, which is a continuation of Ser. No. 79,360, Jun. 18, 1993, abandoned.

[30] Foreign Application Priority Data

Jun. 22, 1992 [JP] Japan .................................... 4-162526

[51] Int. Cl.$^6$ .............................. H04N 5/76; H04N 5/225
[52] U.S. Cl. ......................... 386/113; 386/117; 358/906; 348/208
[58] Field of Search .................................. 386/14, 38, 86, 386/87, 121, 113, 21, 117; 360/70, 73.01, 73.04, 73.09, 73.11, 73.12, 73.13, 73.14; 348/208; 358/906, 909.1; H04N 5/76, 5/78, 5/92, 5/225, 9/79

[56] References Cited

U.S. PATENT DOCUMENTS

| | | | |
|---|---|---|---|
| 4,605,976 | 8/1986 | Ito et al. ..................................... | 360/70 |
| 5,012,270 | 4/1991 | Sekine et al. ............................. | 348/208 |
| 5,175,630 | 12/1992 | Tabuchi et al. ....................... | 360/73.09 |
| 5,189,568 | 2/1993 | Sim et al. .................................. | 360/27 |
| 5,384,595 | 1/1995 | Sakaguchi ................................ | 348/208 |
| 5,727,115 | 3/1998 | Wada ....................................... | 386/113 |

*Primary Examiner*—Thai Tran
*Attorney, Agent, or Firm*—Robin, Blecker & Daley

[57] ABSTRACT

A camera-integrated VTR is arranged to detect an image shake according to a control error signal of a driving control system provided for recording or reproduction by moving a tape and a head relative to each other and to correct the image shake by supplying the result of detection to an image-shake correction circuit.

6 Claims, 4 Drawing Sheets

ELECTRONIC APPARATUS HAVING IMAGE-SHAKE CORRECTING DEVICE

This application is a division of application Ser. No. 08/685,213, filed Jul. 23, 1996, now U.S. Pat. No. 5,727,115 which is a continuation of Ser. No. 08/079,360, filed Jun. 18, 1993, abandoned.

BACKGROUND OF THE INVENTION

1. Field of the Invention:

This invention relates to an image-shake detecting device and an image-shake correcting device and more particularly to an image-shake detecting device and an image-shake correcting device adapted for a camera-integrated type video recording apparatus.

2. Description of the Related Art:

Image-shake correcting devices of varied types have come to be used for the camera-integrated type video A recording apparatus which is sometimes called a camcorder. The basic principle of the image-shake correcting device is to detect the motion of a camera body due to a shake of a camera holding hand and to correct an image shake resulting from the motion of the camera body by moving a picked-up image in the direction of offsetting the motion according to the vector of the motion.

For this purpose, it has been known to detect the motion vector in one of three different manners, including a pure circuit arrangement which detects the motion vector by carrying out an arithmetic operation for matching temporally adjacent pictures with each other, an arrangement using a sensor which electromechanically detects a shake of the camera body, such as an angular velocity sensor, and an arrangement which combines the two arrangements mentioned above.

As for means for offsetting the motion of the camera body according to the detected vector of the motion, two different arrangements have been known. One is optical means arranged to vary and control the apex angle of a variable angle prism in such a way as to offset the vector of the motion. The other is electronic means which is arranged to store a picked-up image on an image memory and to move and change the image reading range on the memory in such a way as to offset the motion vector.

The arrangement to detect the motion vector solely from the picked-up image is advantageous in respect to a reduction in size of the apparatus. This arrangement is, however, apt to perform a faulty action according to the state of the object of shooting. For example, in a case where an image of the object spreads all over a pickup image plane, it is hardly possible to correctly ascribe some movement taking place within the pickup image plane to a movement of the object of shooting itself or to a shake of the image of the object.

Another motion vector detecting arrangement which uses an electromechanical sensor is free from the possibility of the above-stated faulty action. However, that arrangement generally necessitates the use of a plurality of such sensors. These sensors not only require spaces for them but also cause an increase in cost of manufacture.

SUMMARY OF THE INVENTION

This invention is directed to the solution of these problems of the prior art. It is, therefore, a first object of the invention to provide an image recording or reproducing apparatus having an image-shake detecting device which is simply arranged and yet is capable of accurately and reliably detecting image shakes.

It is a second object of the invention to provide a camera-integrated type VTR (video tape recorder) having an image-shake detecting device which is capable of always accurately and reliably detecting image shakes irrespective of the state of the object of shooting.

It is a third object of the invention to provide an electronic apparatus having an image-shake detecting device which is capable of detecting image shakes without recourse to any sensor arranged solely for the purpose of detecting image shakes.

To attain the objects mentioned above, a camera-integrated type video recording apparatus arranged according to this invention as a preferred embodiment thereof comprises driving control means for driving and controlling a video recording medium and a recording head relative to each other, and detecting means for detecting an image shake on the basis of a change of a driving state of the driving control means.

An electronic apparatus arranged as another preferred embodiment of this invention comprises driving means for moving a recording medium and a head relative to each other, image-shake detecting means for detecting an image shake according to a change of a driving state of the driving means, and correcting means for correcting the image shake on the basis of an output of the image-shake detecting means.

It is a fourth object of the invention to provide a video camera arranged such that an image shake is detected by making a comparison in frequency between an image-shake vector obtained by a video signal processing action on a picked-up image signal and a control error signal for a driving system and that either a video signal obtained by correcting it for the image shake or a video signal obtained without image shake correction is selected according to the result of the comparison in frequency.

It is a fifth object of the invention to provide a camera-integrated type video tape recorder which is arranged to be capable of accurately and reliably detecting image shakes by utilizing some mechanism and signals provided for some other purpose without necessitating use of. any sensor arranged solely for the detection of image shakes. The arrangement not only permits reduction in size but also enables the camera-integrated type video tape recorder to accurately make a discrimination between a motion of the object of shooting and a shake of the camera even in a case where the image of the object spreads all over a pickup image plane.

These and other objects and features of this invention will become apparent from the following detailed description of embodiments thereof taken in conjunction with the accompanying drawings.

DETAILED DESCRIPTION OF THE PREFERRED EMBODIMENTS

Embodiments of this invention are described below with reference to the drawings.

Figure 1:
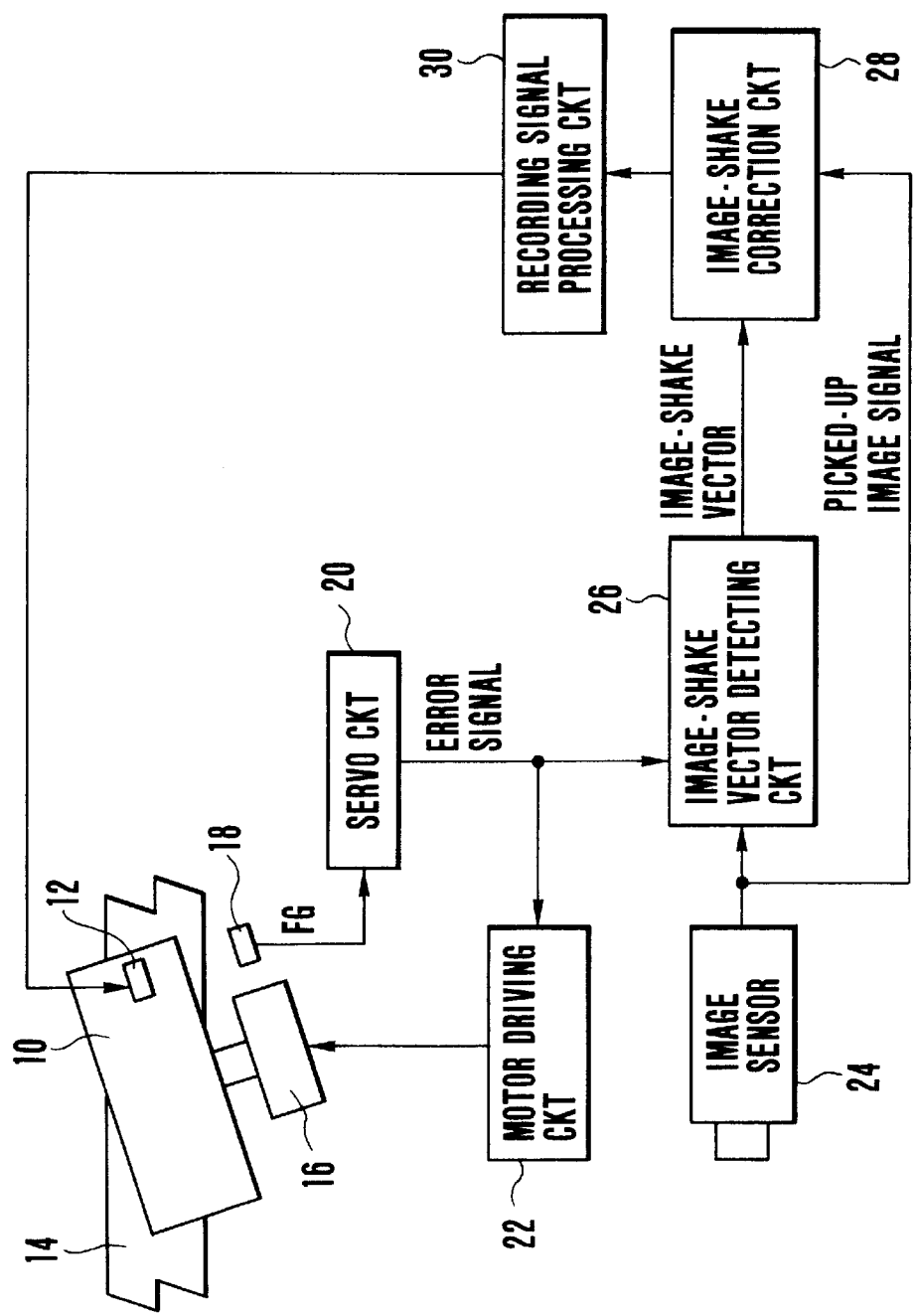
FIG. 1 is a block diagram showing the arrangement of a first embodiment of this invention.

FIG. 1 is a block diagram showing in outline the arrangement of a first embodiment of this invention. In this case, the invention is applied to a camera-integrated type video recorder. The rotation of a rotary cylinder in the video recording part (or the VTR part) of the camera-integrated type video recorder is temporarily caused to become uneven by an external force such as a shake of the recorder. Therefore, in this case, the rotary cylinder is arranged to be used as an image-shake detecting sensor by utilizing its temporary uneven rotation.

Referring to FIG. 1, the rotary cylinder 10 has a recording and reproducing head 12 mounted thereon. A magnetic tape 14 is obliquely wrapped around the rotary cylinder 10 a given degree of angle in such a way as to permit helical scanning by the head 12. A motor 16 is arranged to rotate the rotary cylinder 10 at a given speed. An encoder 18 is arranged to output a pulse signal (hereinafter referred to as FG pulses) in synchronism with the rotation of the motor 16 or that of the rotary cylinder 10. A servo circuit 20 is arranged to compare the FG pulses with a target rotation value set for the rotary cylinder 10 and to output an error signal which indicates a deviation from the target value (hereinafter referred to as a servo error signal). A motor driving circuit 22 is arranged to apply to the motor 16 a motor driving voltage which is obtained by superposing on a given value the servo error signal outputted from the servo circuit 20. In other words, the motor 16, that is, the rotational frequency of the rotary cylinder 10 is controlled and adjusted to a given target value by a closed loop which consists of the motor 16, the encoder 18, the servo circuit 20 and the motor driving circuit 22.

An image sensor 24 is composed of a CCD or the like and is arranged to convert an optical image into an electrical signal. The output (a picked-up image signal) of the image sensor 24 is supplied to an image-shake vector detecting circuit 26 and an image-shake correction circuit 28. The image-shake vector detecting circuit 26 is arranged to detect an image-shake vector by processing the image signal. The image-shake correction circuit 28 is arranged to perform an image-shake correcting action on the output of the image sensor 24 according to the image-shake vector detected and outputted from the image-shake vector detecting circuit 26. Meanwhile, a servo error signal which is outputted from the servo circuit 20 is also applied to the image-shake detecting circuit 26. When the level of the servo error signal comes to exceed a given level, the image-shake vector detecting circuit 26 ceases to operate. With the image-shake vector detecting circuit 26 not operating, no image-shake vector signal is supplied to the image-shake correction circuit 28. In this instance, a signal indicating a zero image-shake vector is outputted from the detecting circuit 26.

With respect to the image-shake vector detection, the means for detecting a motion vector which has been disclosed in U.S. Pat. No. 5,012,270, U.S. patent application Ser. No. 403,455 filed on Sept. 6, 1989, etc., may be used.

Figure 4:
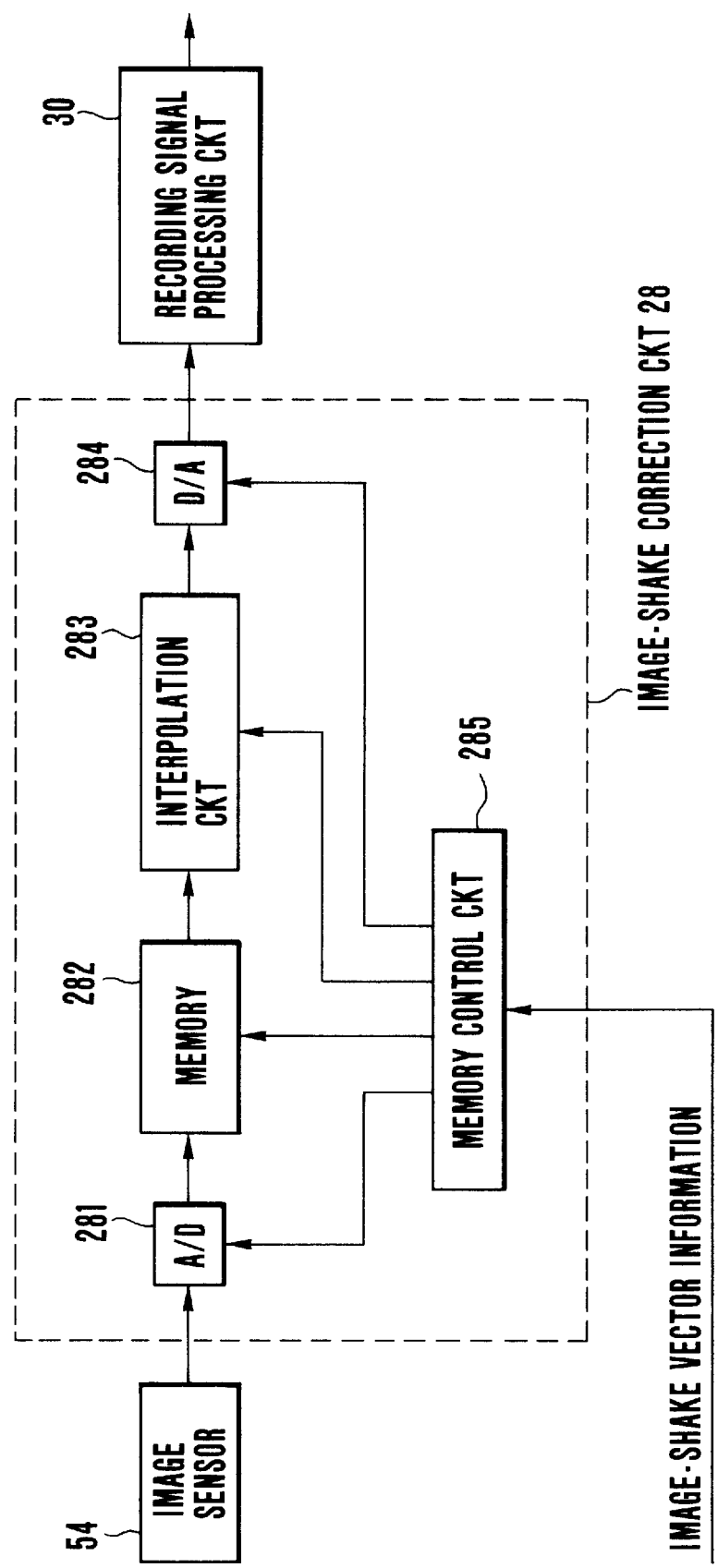
FIG. 4 is a block diagram showing the internal arrangement of an image shake correction circuit.

In accordance with the image-shake vector signal from the image-shake vector detecting circuit 26, the image-shake correction circuit 28 performs an image-shake correcting action on the image signal coming from the image sensor 24, for example, in the following manner: A picked-up image is temporarily stored in an image memory. Then, a reading range smaller than a normal picture size is shifted on the memory in the direction and to an extent by which the image-shake vector can be offset before image data is read out from the reading range thus shifted. The image data is then enlarged to the normal picture size through an electronic process and interpolated with some picture element data as necessary. FIG. 4 shows an arrangement necessary for this process.

FIG. 4 is a block diagram showing the internal arrangement of the image-shake correction circuit 28 shown in FIG. 1. Referring to FIG. 4, an image signal outputted from an image sensor 54 is supplied to an A/D conversion circuit 281 to be converted into a digital signal. The digital signal is stored in a field or frame memory 282 at a given rate under the control of a memory control circuit 285. The memory control circuit 285 is arranged to shift a reading position on the memory 282 from which the image stored in the memory 282 is to be read out, in the direction of offsetting a motion of the image caused by an image shake, on the basis of an image-shake-vector information output from the image-shake vector detecting circuit 26. An image shake is thus corrected by shifting the reading position in reading out the image stored.

Further, according to the image-shake correcting action described above, the image read out from the memory 282 is smaller than an actual image plane size, because the range of the reading position on the memory 282 is arranged to be smaller than the actual image plane size by as much as an extent to which the reading position is to be shifted for the correction of the image shake. The memory control circuit 285 is, therefore, arranged to enlarge the stored image by controlling a reading rate in reading the image out from the memory 282. After reading, the image read out is interpolated by an interpolation circuit 283. The output of the interpolation circuit 283 is supplied to a D/A conversion circuit 284 to be converted into an analog image signal. The analog image signal is then supplied to a recording signal processing circuit 30.

The recording signal processing circuit 30 is arranged to perform a recording signal processing action on the output of the image-shake correction circuit 28. In other words, the recording signal processing action is performed on the picked-up image signal after the picked-up image signal has been corrected for any image shake. The signal thus processed is applied to the magnetic head 12 to be recorded on the magnetic tape 14.

Figure 2:
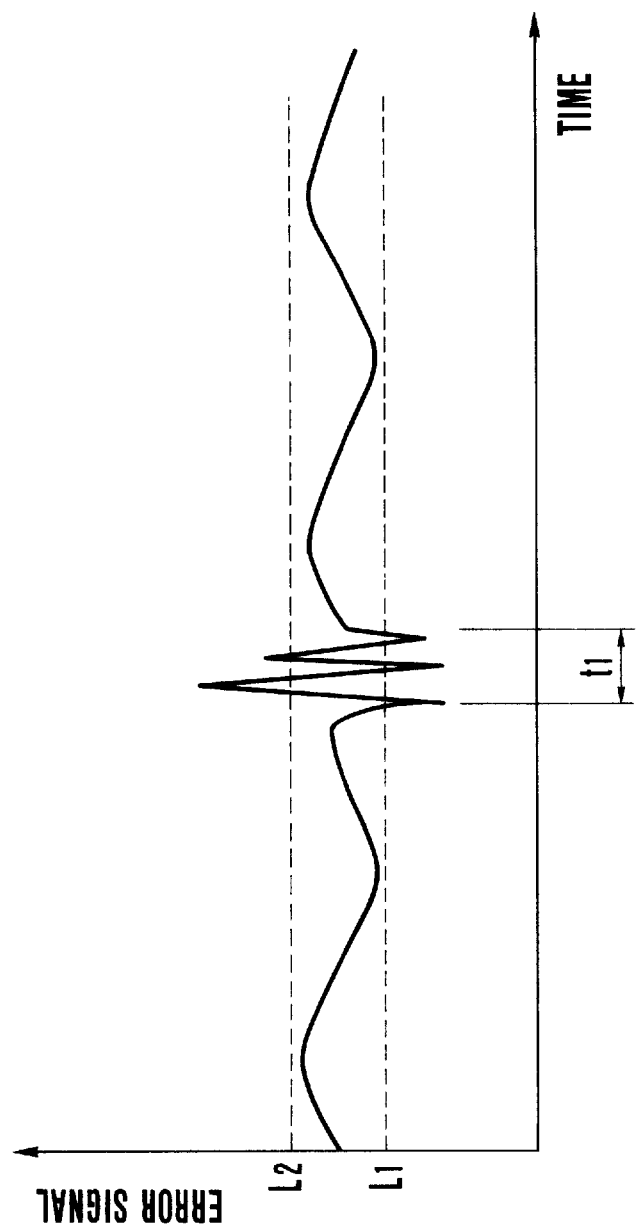
FIG. 2 is a waveform chart showing the waveform of a servo error signal.

The operation of the embodiment to be performed in the event of occurrence of an image shake is described in detail as follows: FIG. 2 shows the waveform of the servo error signal outputted from the servo circuit 20 obtained before and after occurrence of the image shake. In the case of a video recording (and/or reproducing) apparatus of the helical scanning type, like the recorder of this embodiment, the rotary cylinder of the apparatus must be rotated exactly at a given speed. Therefore, the servo error signal which is to be used for controlling the rotation of the rotary cylinder normally varies only within a small level range.

However, when the body of the recorder is shaken or vibrated by some external force, the rotational frequency of the rotary cylinder 10 greatly deviates from a target value. Then, the servo circuit 20 outputs a large servo error signal in an attempt to bring the rotational frequency of the rotary cylinder back to its normal value. As a result, as shown in FIG. 2, the servo error signal deviates for a short period of time from a given level range L1–L2 and vibrates at the frequency of the image shake to mitigate the deviation. Therefore, the occurrence or nonoccurrence of an image shake thus can be detected by the level or by the presence or absence of an excessive frequency component of the servo error signal.

The image-shake vector detecting circuit 26 detects an image-shake vector by performing a matching arithmetic operation on the image signal output of the image sensor 24 for a period of time tl during which the servo error signal supplied from the servo circuit 20 fluctuates in excess of a given level. The value of an image-shake vector thus detected is supplied to the image-shake correction circuit 28. It is of course possible to detect an image-shake vector always from the image signal output of the image sensor 24 and to on/off control the output and supply of the detected image-shake vector to the image-shake correction circuit 28 by means of the servo error signal output from the servo circuit 20.

The image-shake vector detecting circuit 26 may be arranged such that the servo error signal supplied from the servo circuit 20 is monitored at least for one period thereof and the level varying range or a predetermined high-frequency level of the servo error signal is stored when the body of the recorder is in repose, and, after that, the presence or absence of any image shake is determined by comparing the current level of the servo error signal (or a component of it exceeding a given frequency) with the level value stored.

The embodiment shown in FIG. 1 is arranged to control the operation of the image-shake vector detecting circuit 26 by means of the servo error signal. However, this arrangement may be changed to control the supply of the image-shake vector to the image-shake correction circuit 28 from the image-shake vector detecting circuit 26. More specifically, the image-shake vector detecting circuit 26 may be arranged to detect an image-shake vector irrespective of the servo error signal and, in a case where an image shake is determined through the servo error signal, the image-shake vector supplied from the image-shake vector detecting circuit 26 to the image-shake correction circuit 28 is forcedly brought to zero.

Figure 3:
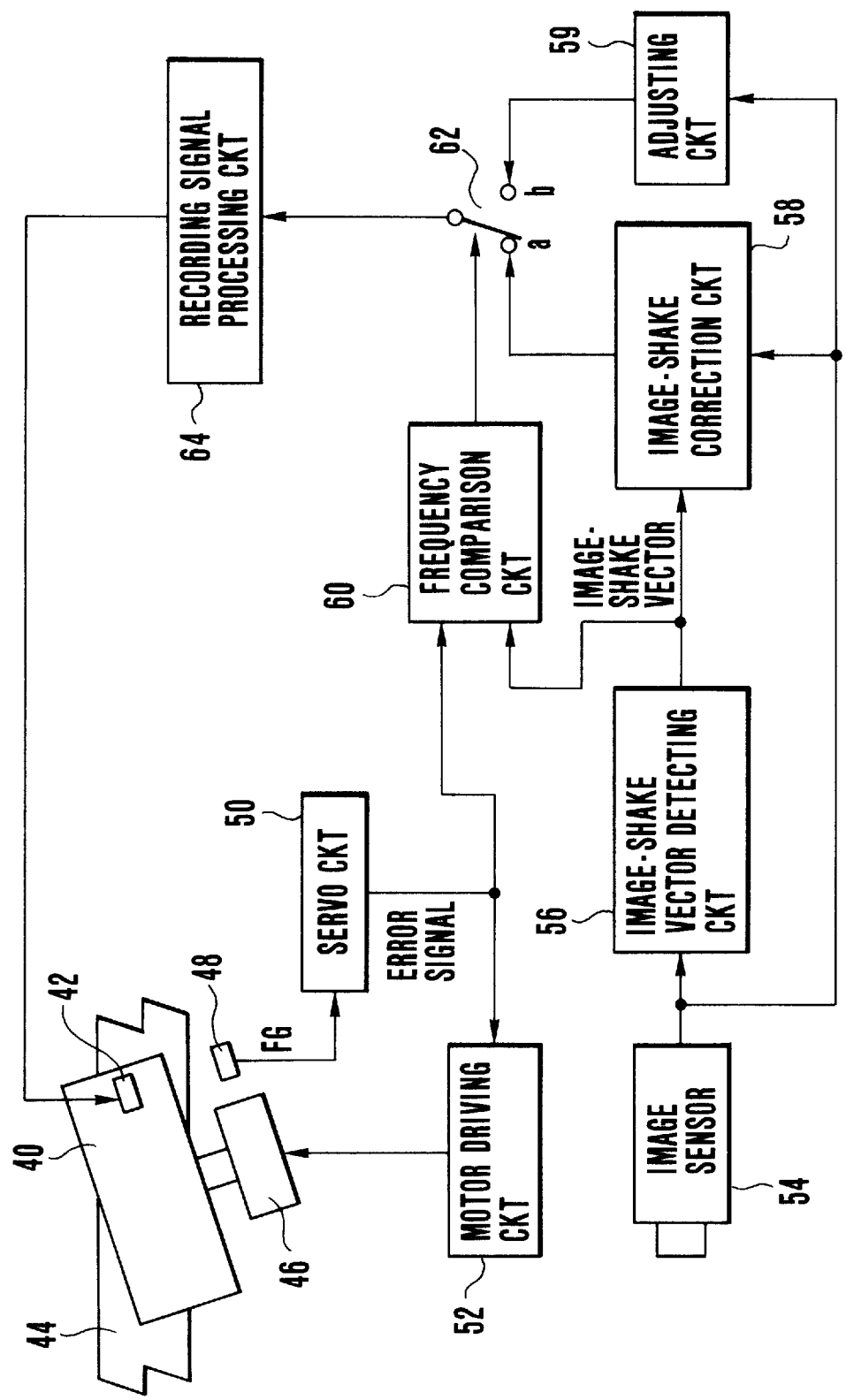
FIG. 3 is a block diagram showing the arrangement of a second embodiment of this invention.

FIG. 3 is a block diagram showing in outline the arrangement of a second embodiment of this invention. The illustration includes a rotary cylinder 40, a recording and reproducing magnetic head 42, a magnetic tape 44, a motor 46 arranged to rotate the rotary cylinder 40, an encoder 48 arranged to output FG pulses in synchronism with the rotation of the motor 46 or that of the rotary cylinder 40, a servo circuit 50 arranged to compare the FG pulses output from the encoder 48 with a target rotation value and to output a servo error signal indicating any deviation from the target value, and a motor driving circuit 52 arranged to obtain a motor driving voltage by superposing the servo error signal on a given value and to apply this voltage to the motor 46. These parts are arranged in the same manner as the parts 10 to 22 of the first embodiment shown in FIG. 1.

Referring to FIG. 3, an image sensor 54 converts an optical image of a shooting object into an electrical signal. An image-shake vector detecting circuit 56 is arranged to detect an image-shake vector from the signal output of the image sensor 54 by performing an image signal processing action on the signal. An image-shake correction circuit 58 is arranged to perform an image-shake correcting action on the image signal output of the image sensor 54. The function of the image-shake a correction circuit 58 may be arranged to be identical with that of the image-shake correction circuit 28 of FIG. 1. An adjusting circuit 59 is arranged to impart to the output of the image sensor 54 the same time delay and the same change in angle of view as the time delay and the change in angle of view obtained through the image-shake correction circuit 58.

A frequency comparison circuit 60 is arranged to make a comparison in frequency between the servo error signal outputted from the servo circuit 50 and the image-shake vector outputted from the image-shake vector detecting circuit 56. A switch 62 is arranged to select either the output of the image-shake correction circuit 58 by a contact "a" thereof or the output of the adjusting circuit 59 by another contact "b" thereof under the control of the output of the frequency comparison circuit 60. A recording signal processing circuit 64 is arranged to perform recording signal processing actions (such as modulation, etc.) on the signal selected by the switch 62 and to apply the signal thus processed to the magnetic head 42.

The image sensor 54 converts an optical image of the object of shooting into an electrical signal. The signal output of the image sensor 54 is applied to the image-shake vector detecting circuit 56, the image-shake correction circuit 58 and the adjusting circuit 59. The image-shake vector detecting circuit 56 detects an image-shake vector from the output of the image sensor 54 by carrying out an image signal processing action on the output of the image sensor 54. The image-shake vector thus detected is applied to the frequency comparison circuit 60 and the image-shake correction circuit 58. In accordance with the image-shake vector from the image-shake vector detecting circuit 56, the image-shake correction circuit 58 corrects the image signal from the image sensor 54 for the image shake. The adjusting circuit 59 imparts the same time delay and the same change of angle of view as those obtained by the image-shake correction circuit 58 to the output of the image sensor 54. As a result, an image signal which has been corrected for the image shake is supplied to the contact "a" of the switch 62. To the other contact "b" of the switch 62 is supplied an image signal obtained without image shake correction.

The rotation of the rotary cylinder 40 is controlled to a given target rotational frequency by a closed loop which consists of the encoder 48, the servo circuit 50, the motor driving circuit 52, the motor 46 and the rotary cylinder 40. During the process of this control, the servo error signal outputted from the servo circuit 50 is periodically fluctuating within a small level range as mentioned in the foregoing with reference to FIG. 2 even when the body of the apparatus (hereinafter referred to as the camera body) is in repose. When an external force is applied to the camera body, the servo error signal comes to change at a frequency according to the shake of the camera body thus caused.

The frequency comparison circuit 60 makes a comparison in frequency between the servo error signal outputted from the servo circuit 50 and the image-shake vector outputted from the image-shake vector detecting circuit 56. In the event of an image shake due to shaking of the camera body, the servo error signal and the image-shake vector have the same frequency component which corresponds to the shaking of the camera body. In other words, the camera body can be considered to be not shaking when the servo error signal and the image-shake vector do not have the same frequency component.

With the servo error signal and the image-shake vector frequency-compared with each other, if the two signals are found to have frequency components which are fairly close to each other, the frequency comparison circuit 60 connects the switch 62 to its contact "a". If not, the frequency comparison circuit 60 connects the switch 62 to its contact "b". In other words, the switch 62 is operated to select an image signal obtained after the image shake correction by the image-shake correction circuit 58 when the camera body is shaking or to select an image signal outputted from the adjusting circuit 59 without any image shake correction when the camera body is not shaking.

The image signal selected by the switch 62 is supplied to the recording signal processing circuit 64. The output of the signal processing circuit 64 is recorded on the magnetic tape 44 by the magnetic head 42.

The second embodiment is arranged to select the image signal obtained through the image shake correction process or the image signal obtained without image shake correction. However, this arrangement may be changed to control the supply of the image-shake vector from the image-shake vector detecting circuit 56 to the image-shake correction circuit 58. That modification dispenses with the adjusting circuit 59.

Each of the embodiments described is arranged to use a magnetic tape as a recording medium. However, this invention is not limited to such a case but is applicable of course also to other cases where recording is to be made on a disk-shaped recording medium such as a hard disk, an optical disk or a magneto-optical disk. Further, while the embodiments described are arranged to correct image shakes in an electronic manner, the invention is applicable also to such a case where image shakes are to be corrected in an optical manner. In that case, the picked-up image mentioned in the foregoing is an optical image obtained before a photo-electric converting action is performed by the image sensor.

As is parent from the foregoing description, image shakes can be accurately and reliably detected without arranging any sensor solely for the purpose of detecting the image shakes. Therefore, in accordance with this invention, a camera-integrated type video recorder can be compactly and cheaply arranged.

What is claimed is:

1. A camera-integrated type video recorder apparatus comprising driving control means for driving and controlling a video recording medium and a recording head relative to each other, image-shake vector detecting means for detecting an image-shake vector from a picked-up image signal by performing a video signal processing action on the picked-up image signal, image-shake correction means for correcting the picked-up image signal for an image shake according to the image-shake vector detected by said image-shake vector detecting means, and frequency comparison means for making a comparison in frequency between a control error signal of said driving control means and the image-shake vector detected by said image-shake vector detecting means.

2. An image-shake correcting device for a camera-integrated type video recorder apparatus having driving control means for driving and controlling a video recording medium and a recording head relative to each other, comprising:

a) image-shake vector detecting means for detecting an image-shake vector from a picked-up image signal by performing a video signal processing action on the picked-up image signal;

b) image-shake correction means for correcting the picked-up image signal for an image shake according to the image-shake vector detected by said image-shake vector detecting means; and c) control means for controlling an operation of said image-shake vector detecting means and/or that of said image-shake correction means according to a control error signal of said driving control means.

3. A device according to claim 2, wherein the operation of said image-shake vector detecting means is controlled according to said control error signal.

4. A device according to claim 2, wherein the operation of said image-shake correction means is controlled according to said control error signal.

5. An image shake correcting device for a camera-integrated type video recorder apparatus having driving control means for driving and controlling a video recording medium and a recording head relative to each other, comprising:

a) image-shake vector detecting means for detecting an image-shake vector from a picked-up image signal by performing a video signal processing action on the picked-up image signal;

b) image-shake correction means for correcting the picked-up image signal for an image shake according to the image-shake vector detected by said image-shake vector detecting means;

c) frequency comparison means for making a comparison in frequency between a control error signal of said driving control means and the image-shake vector detected by said image-shake vector detecting means; and d) selection means for selecting either an image signal obtained through the image-shake correction or an image signal obtained without the image-shake correction, according to a result of the comparison made by said frequency comparison means.

6. An image shake correcting device for a camera-integrated type video recorder apparatus having driving control means for driving and controlling a video recording medium and a recording head relative to each other, comprising:

a) image-shake vector detecting means for detecting an image-shake vector from a picked-up image signal by performing a video signal processing action on the picked-up image signal;

b) image-shake correction means for correcting the picked-up image signal for an image shake according to the image-shake vector detected by said image-shake vector detecting means; and c) frequency comparison means for making a comparison in frequency between a control error signal of said driving control means and the image-shake vector detected by said image-shake vector detecting means, an operation of said image-shake correction means being controlled according to a the result of the comparison made by said frequency comparison means.

* * * * *

UNITED STATES PATENT AND TRADEMARK OFFICE
CERTIFICATE OF CORRECTION

PATENT NO. : 5,872,886
DATED : February 16, 1999
INVENTOR(S) : Hidetoshi Wada

It is certified that error appears in the above-identified patent and that said Letters Patent is hereby corrected as shown below:

Column 1, line 19, delete "A".
Column 7, line 24, delete "parent" and insert --apparent--.

Signed and Sealed this

Seventh Day of March, 2000

Attest:

Q. TODD DICKINSON

Attesting Officer

Commissioner of Patents and Trademarks